United States Patent [19]

Reese et al.

[11] Patent Number: 4,500,034
[45] Date of Patent: Feb. 19, 1985

[54] ELECTRONIC CONTROL ARRANGEMENT FOR SYSTEM POWERED HVAC TERMINAL UNITS

[75] Inventors: James A. Reese; Raymond H. Dean, both of Johnson County, Kans.

[73] Assignee: Tempmaster Corporation, Kansas City, Mo.

[21] Appl. No.: 432,086

[22] Filed: Sep. 30, 1982

[51] Int. Cl.³ .................. F24F 7/00; G05D 23/00
[52] U.S. Cl. .................................. 236/49; 236/84; 165/22
[58] Field of Search .................. 236/49, 80 R, 84, 85, 236/82, 87, 80 F, 79, 1 B, 46 R, 47; 165/16, 22

[56] References Cited

U.S. PATENT DOCUMENTS

| | | | |
|---|---|---|---|
| 4,058,253 | 11/1977 | Munk et al. | 236/49 |
| 4,147,296 | 4/1979 | Spethmann | 236/1 B |
| 4,205,381 | 5/1980 | Games et al. | 165/16 |
| 4,212,078 | 7/1980 | Games et al. | 165/22 |
| 4,215,408 | 7/1980 | Games et al. | 236/46 R |
| 4,312,475 | 1/1982 | Edwards et al. | 236/82 X |

Primary Examiner—Harry B. Tanner
Attorney, Agent, or Firm—Kokjer, Kircher, Bradley, Wharton, Bowman & Johnson

[57] ABSTRACT

The desirable features of self powered air distribution terminals and electronic controls are combined by providing an interface between the electronic controls and one or more self powered terminal units in an air distribution system. The electronic controls monitor temperatures and other conditions and provide electric signals each having a voltage which represents the difference between the sensed condition and a set condition entered into the system microprocessor. The interface may be an electro-pneumatic transducer or a set of solenoid valves. The interface responds to the electric signals by applying proportional pressure signals to one or more terminal units. The flow of conditioned air into the area or areas served by the system is then adjusted to conform the actual conditions with the set conditions.

8 Claims, 7 Drawing Figures

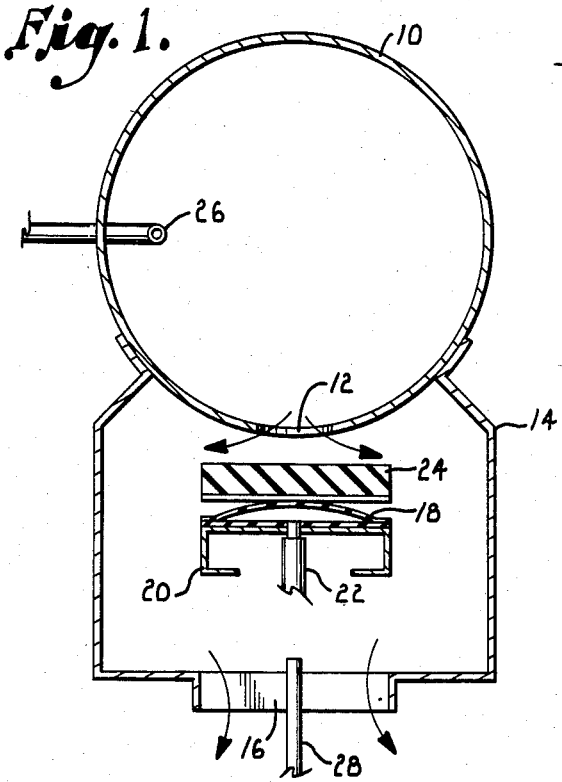
Fig. 1.
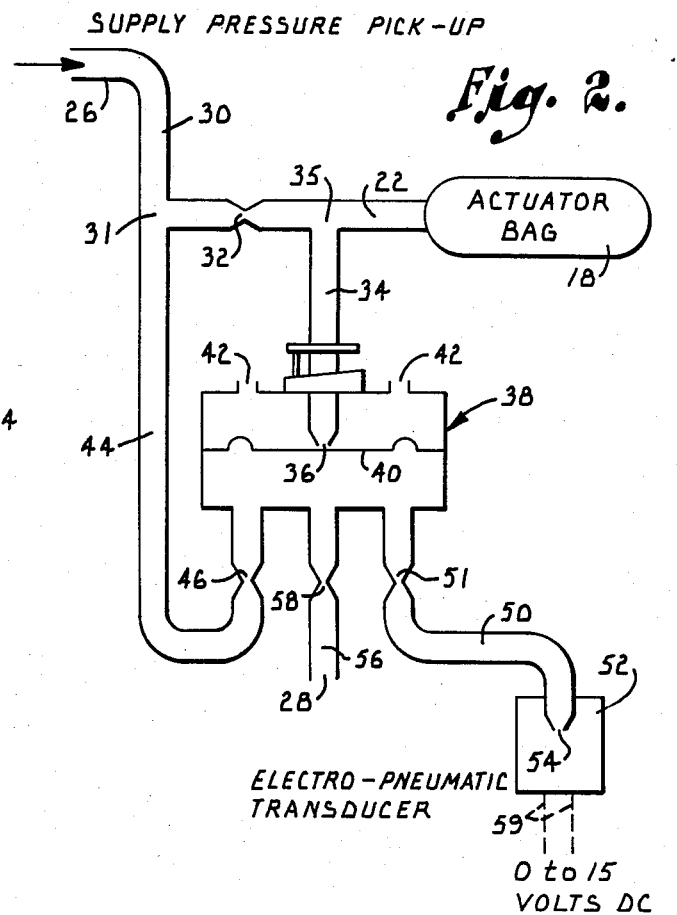
Fig. 2.
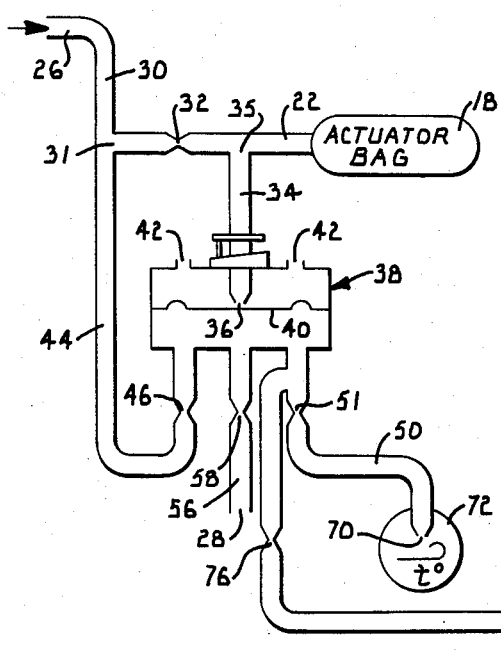
Fig. 3.
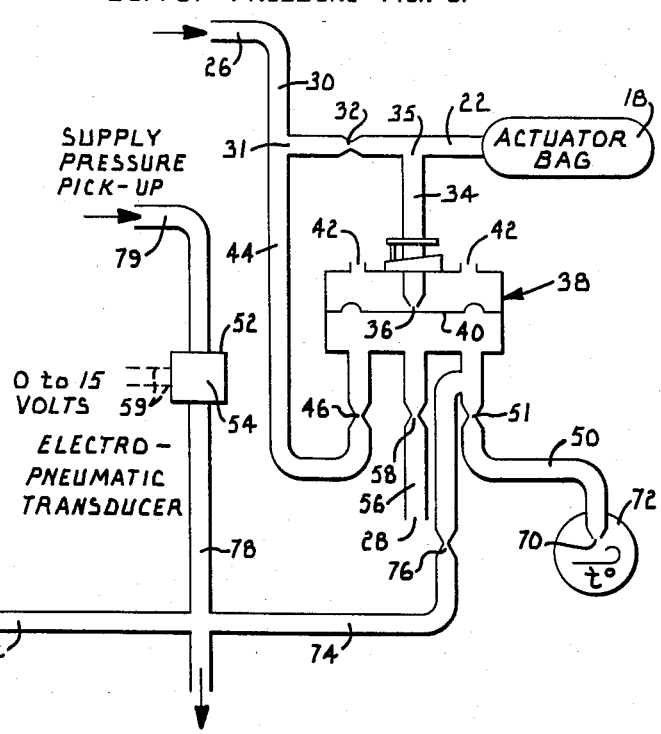

ELECTRONIC CONTROL ARRANGEMENT FOR SYSTEM POWERED HVAC TERMINAL UNITS

BACKGROUND OF THE INVENTION

This invention relates generally to air distribution systems and more particularly to a system powered terminal unit that is controlled by central electronic control equipment.

The heating and cooling of buildings such as large office buildings is typically achieved by heating or cooling air and passing the conditioned air through ventilating ducts leading to the separate offices or other areas of the building. It is highly desirable to provide individual temperature control for the separate areas of the building, and this is normally accomplished by equipping each duct or air diffuser with a flow control device. By providing individual control of each flow control device, the volume of conditioned air flowing into each area of the building can be separately controlled. Air distribution systems of this type are generally high in efficiency and low in cost since they can utilize a single large heating or cooling unit to supply several rooms or floors of the building. At the same time, there is no sacrifice in the individual temperature control for each office.

U.S. Pat. No. 4,312,475 to Edwards et al discloses a variable air volume terminal unit that has significant advantages over other system powered units. In addition to the benefits set forth in the patent, the casing of the terminal unit forms an extension of the trunk duct system, thereby eliminating the need for run out ducts and the attendant pressure losses. The duct system thus has a lower initial cost and, perhaps more importantly, the duct design can be optimized to reduce the system static pressure by at least one half inch W.G. The terminal unit itself requires about one half inch W.G. less pressure than other known terminals. The overall result is that the fan static pressure requirements are reduced by about one inch W.G. which amounts to an energy saving of approximately ten percent of the total energy cost of a typical office building. The primary disadvantage of system powered terminal units has been that there is a lack of communication between them and other parts of the air distribution system. Consequently, conditions in other areas of the building are not taken into account in controlling the terminal unit.

An electronic control circuit for regulating the heating and cooling of a building is shown in pending U.S. patent application Ser. No. 328,112 abandoned, filed on Dec. 7, 1981 by Ken Aubrey. The central control provided by this type of energy management system permits the building HVAC system to be monitored and controlled from a single central location. A readout can be provided for the temperature in each zone of the building, and the temperatures can be reset from the control console individually in each zone or collectively for all zones on either a daily or weekly basis. Consequently, energy consumption can be minimized by heating and cooling the building only when and where necessary. Energy is further conserved since outside weather conditions can be monitored and taken into account in initiating the heating or cooling at the proper time to achieve the desired building temperature when people begin to arrive in the building. The total electrical load can be limited to create additional energy savings.

An electronic energy management system can also save on maintenance costs by reducing the time and labor involved in trouble shooting the equipment. When a monitored condition departs from a preset range, the system provides a warning which pinpoints both the problem and its location so that corrective measures can be taken before a serious equipment failure occurs. The need for servicemen and the time required to investigate problems are thus significantly reduced, as is the down time of the equipment. In addition to temperatures, electronic systems can easily monitor other conditions such as fire. The presence of a fire can be detected by suitable smoke or fire detectors, and the flow of conditioned air to the floor of the fire can be shut off while the air flow can be maximized to other floors. This results in pressurization of the areas around the fire to help contain it and to prevent smoke from spreading, as increasingly required by modern fire codes.

SUMMARY OF THE INVENTION

The principal goal of the present invention is to provide an electronically controlled system powered HVAC terminal unit which combines the desirable features of electronic controls and system powered terminals. This is achieved in one form of the invention by utilizing an electro-pneumatic transducer to provide an interface between the electronic controls and the pneumatic circuit that actuates the system powered terminal unit. The transducer receives electrical control signals from a satellite controller that is in turn controlled by a central microprocessor, and the transducer responds to the electrical signals by applying porportional pressure signals to the pneumatic circuit. The flow control device is then adjusted to achieve the flow of conditioned air that is necessary to maintain the desired temperature conditions.

A number of separate terminal units can be controlled by a single transducer so that each terminal normally operates under the control of a thermostat in the room or other area it serves. The transducer, under the control of the programmable electronic control system, can simultaneously shut off all terminals and can also simultaneously reset all terminals. Thus, heating can be eliminated or curtailed overnight when the building is unoccupied and resumed in the morning before the occupants return. By monitoring outside temperature conditions and operating the terminal units in a fast warm-up mode, heating can be initiated in the morning at the latest possible time necessary to raise the building temperature to a comfortable level by the time it becomes occupied. Additional conditions such as total electric load demand and the presence of fire can be sensed by suitable monitoring devices. Fire and smoke can be contained by closing all terminal units on the floor of the fire and opening all terminals on other floors.

Low cost electric solenoid valves can be used as an alternative means for interfacing the electrical and pneumatic portions of the system. By applying appropriate electric signals to the solenoid valves from the electronic controls, the terminal unit can be made to act normally under the control of a room thermostat, it can be shut down completely (for example, when the building is unoccupied or there is a fire), or it can be fully opened (to achieve fast warm up or help contain a fire on another floor). A number of terminal units can be controlled by a single set of solenoid valves, and the terminals can be opened and closed collectively under the control of the programmable micro processor that is included in the central controller.

DESCRIPTION OF THE DRAWINGS

In the accompanying drawings which form a part of the specification and are to be read in conjunction therewith and in which like reference numerals are used to indicate like parts in various views:

FIG. 1 is a sectional view taken on a vertical plane through the ventilation duct and air diffuser of a system powered terminal unit constructed according to a preferred embodiment of the present invention, with the inflatable bladder in a fully deflated condition;

FIG. 2 is a schematic diagram of the electrically controlled pneumatic circuit of the terminal unit shown in FIG. 1;

FIG. 3 is a schematic diagram of a modified form of the invention showing plural pneumatic circuits which are electrically controlled by a common electro-pneumatic transducer;

DETAILED DESCRIPTION OF THE INVENTION

Figure 4:
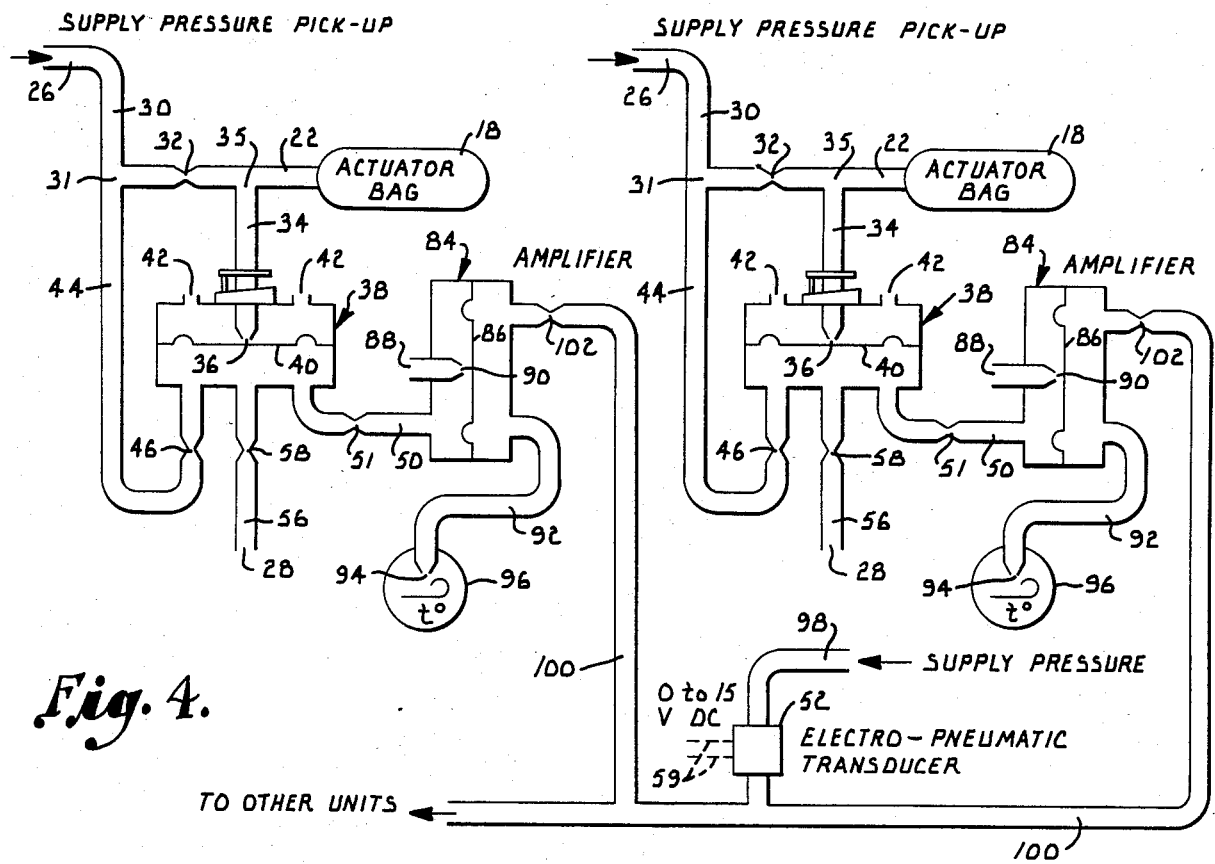
FIG. 4 is a schematic diagram showing another modified form of the invention having plural pneumatic circuits controlled by a common electro-pneumatic transducer.

Referring initially to FIG. 1, the system powered terminal unit shown therein is identical to that shown in U.S. Pat. No. 4,312,475 to Edwards, et al. which is incorporated by reference herein. Numeral 10 identifies a cylindrical duct which receives conditioned air from a suitable heating or cooling unit (not shown). The conditioned air is supplied by a fan (not shown) to duct 10 at a relatively high supply pressure and is discharged from the duct at a relatively low pressure through an elongate outlet slot 12 formed in the bottom of the duct. An air diffuser 14 receives the air discharged through slot 12 and distributes the air to a room or other area which is to be heated or cooled. The air is directed into the room through a slot 16 in the bottom of the air diffuser.

The flow of conditioned air through slot 12 is controlled by an inflatable air bag or bladder 18 which is shown in the fully deflated conditioned in FIG. 1. Bladder 18 is supported on top of a metal pan 20 located within the diffuser structure 14. Air for inflation of bladder 18 is supplied thereto by a conduit 22. A foam pad 24 is disposed above bladder 18 and is moved toward and away from slot 12 upon inflation and deflation of the bladder. When the bladder is fully inflated, pad 24 seals slot 12 to prevent discharge of air therefrom. In the fully deflated condition of the bladder shown in FIG. 1, pad 24 is located well below slot 12 to permit the conditioned air to flow essentially freely out of the slot and into the room.

A supply pressure pickup fitting 26 picks up the main supply pressure of the conditioned air in duct 10. Fitting 26 is in the form of an open ended tube having its open end facing in a direction to receive the air which is forced through duct 10 by the fan (not shown). A flow sensor 28 is located adjacent slot 16 on the low pressure side of bladder 18 in order to sense the velocity of the air discharged through slot 12. The flow sensor 28 may take the form of an open ended tube having its open end facing upwardly within the diffuser structure 14 and below slot 12, or it may be a long perforated manifold. The pressure in the flow sensor is determined primarily by the pressure drop across the diffuser which directs air into the room.

Referring now more particularly to the pneumatic control circuit shown in FIG. 2, the supply pressure pickup fitting 26 connects with a conduit 30 having a T-connection 31 with the conduit 22 which supplies the actuator bag or bladder 18. Between the Tee 31 and bladder 18, conduit 22 is provided with an orifice 32 having a diameter of approximately 0.078" in a preferred form of the invention. An exhaust line 34 has a Tee connection 35 with conduit 22 and serves to bleed pressure from bladder 18 in order to effect deflation of the bladder and increased flow through slot 12. Line 34 terminates in a control orifice 36 which is located within the casing of an amplifying relay generally indicated at 38. Orifice 36 is located centrally above a flexible diaphragm 40 mounted within the casing of the relay. The upper side of diaphragm 40 is vented to atmosphere through plural vent openings 42, and the pressure above diaphragm 40 is thus atmospheric except for the small area of orifice 36. It is to be noted that when diaphragm 40 is displaced upwardly, it closes off the control orifice 36 to prevent bleeding of pressure from bladder 18. The weight of the diaphragm, in cooperation with a spring (not shown) if desired, urges the diaphragm downwardly toward the open position.

Conduit 30 connects through T-connection 31 with another conduit 44 which extends into the bottom of relay 38 to communicate with the underside of diaphragm 40. Conduit 44 is provided with an orifice 46 which has a diameter of approximately 0.007" in a preferred form of the invention. In actual practice, conduit 44 essentially forms a continuation of conduit 30 and serves to apply the supply pressure, through orifice 46, to the underside of diaphragm 40.

Extending from the underside of the diaphragm 40 is a conduit 50 provided with a limiting orifice 51. Orifice 51 has a diameter of approximately 0.020". An electro-pneumatic transducer 52 controls the flow through a terminating control port 54 which vents line 50 through the transducer. The transducer will be described in more detail hereinafter.

The velocity sensor 28 connects with a conduit 56 which leads through an orifice 58 to the underside of diaphragm 40. The relatively low pressure at the velocity sensor is thus transmitted through orifice 58 and is applied against the underside of diaphragm 40 along with the pressure transmitted through orifice 46. In a preferred embodiment of the invention, orifice 58 has a diameter of approximately 0.010". The size of orifice 58 is thus considerably less than that of orifice 51 but is greater than that of orifice 46.

The electro-pneumatic transducer 54 receives electric signals of between 0 and 15 volts DC on conductors 59 leading to the transducer. In response, the transducer electromagnetic coil (not shown) modulates the extent to which the control port 54 is open and thus controls the extent to which line 50 is vented to atmosphere. The pressure signal provided to line 50 by the transducer is proportional to the voltage applied to the transducer. Transducer 52 must accurately control very low pressures. It receives 0-15 volt DC electric signals and converts them to proportional pressures of 0-0.05 inch W.G. in a preferred form of the invention.

Figure 5:
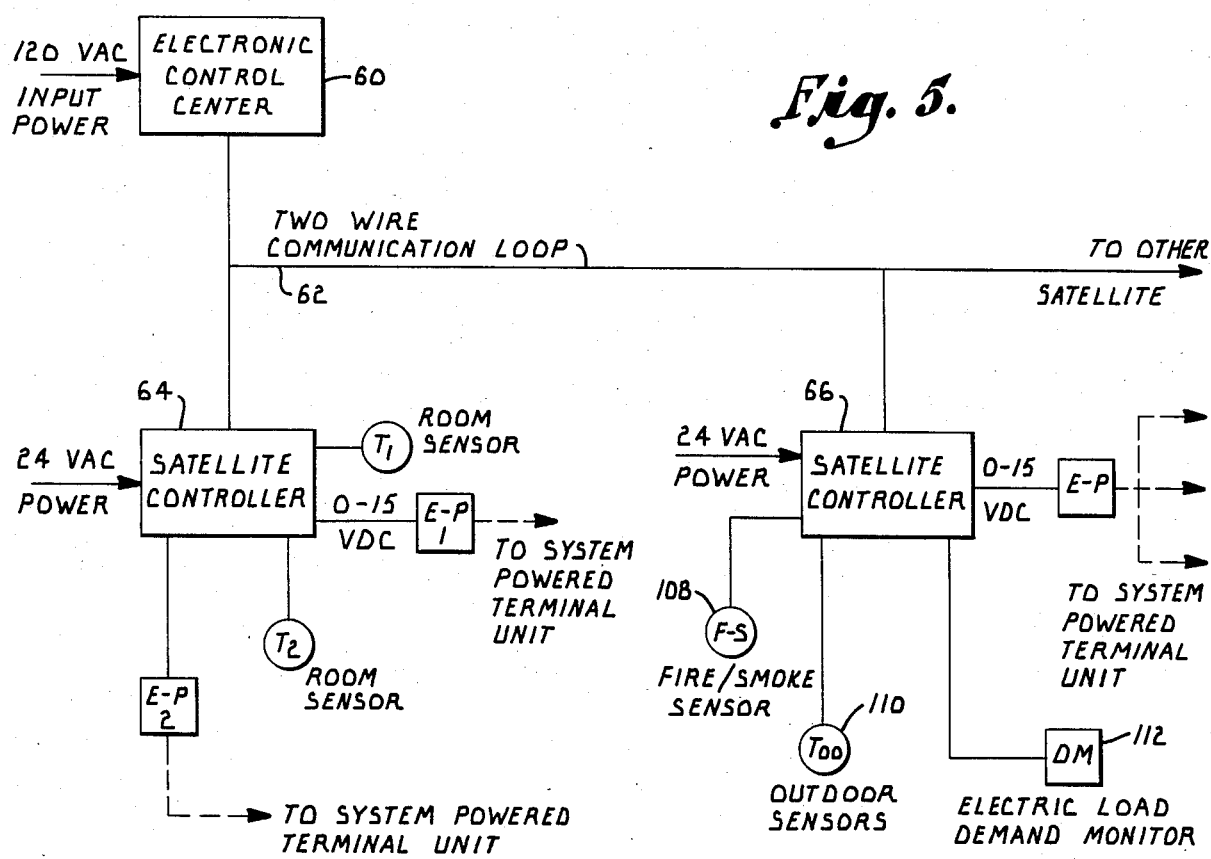
FIG. 5 is a block diagram of the electronic control arrangement which controls the pneumatic circuits of the terminal units.

FIG. 5 shows in block diagram form the electronic control system which applies electric signals for operation of the electro-pneumatic transducer 52. The electronic control system includes an electronic control center 60 which is a centrally located micro processor based control center that operates under the control of programmed instructions. The electronic control center 60 is connected by a two wire communication loop 62 with a number of satellite controllers, two of which are designated in FIG. 5 by numerals 64 and 66. The control center receives input power at 120 volts A.C., while each satellite controller receives 24 volt A.C. power. The satellite controllers are spread throughout the building in the areas served by the air distribution system. Controller 64 has room sensors T1 and T2 in the separate rooms it serves, and it applies electric signals in the range of 0-15 volts D.C. to electropneumatic transducers designated E-P1 and E-P2. The transducers correspond to the transducer 52 shown in FIG. 2.

The room sensors T1 and T2 sense the actual temperatures in the rooms they serve and provide to satellite controller 64 signals corresponding to the sensed temperatures. The satellite controller 64 in turn transmits electric signals corresponding to the sensed parameters to the electronic control center 60 via the communication loop 62. Coded data that has been previously entered into the control center (such as set temperature, time of day, day of the week, etc.) is transmitted to the satellite controller 64. The satellite controller compares the actual temperature from a room sensor with the appropriate set temperature from the control center and transmits a difference signal to the electro-pneumatic transducer. The voltage of this signal causes the electropneumatic transducer to apply an output pressure signal to the pneumatic circuit which is proportional to the voltage. The pneumatic pressure signal applied by the transducer affects the system powered pneumatic controls in a manner to vary the flow of conditioned air such that the temperature in the room is increased or decreased to conform with the set temperature. In this fashion, the voltage of the electric signals provided by the satellite controllers achieves control of the conditioned air flow, and the signal voltage is determined by the sensed conditions in the building.

To exemplify the operation of the system powered terminal unit shown in FIG. 2, it will be assumed that the electronic control center 60 has been programmed to achieve a space temperature of 75° F. between the hours of 8:00 AM and 6:00 PM and a space temperature of 80° F. between the hours of 6:00 PM and 8:00 AM. Thus, at 8:00 AM, the central center transmits a 75° F. set command to the satellite controller. Suppose the space temperature is 80° F. as sensed by the room sensor T1. Since the set temperature is now 75° F., the satellite controller applies to transducer E-P1 a signal reducing the pressure of the bladder 18 so that cool air will be applied to the room to lower the temperature to 75° F. The voltage signal applied to transducer E-P1, (which corresponds to transducer 52 shown in FIG. 1), causes the transducer to open its control port 54. The pressure that is applied to the underside of diaphragm 40 is then bled off through orifice 51 and the control port 54. The constriction provided by the small (0.007 inch) orifice 46 permits the pressure below diaphragm 40 to approach atmospheric pressure, and the weight of the diaphragm causes it to move downwardly to open orifice 36. Pressure is then bled from bladder 18 through the exhaust line 34 and through orifice 36 and the vent openings 42. Bladder 18 is thus deflated to open slot 12 and permit cool conditioned air to flow into the room. As the flow through the duct outlet increases, the pressure increases at the velocity sensor 28, and, if the flow becomes high enough, the pressure at the velocity sensor builds up to the level necessary to cause diaphragm 40 to restrict orifice 36. The velocity sensor pressure is applied through orifice 58 to the underside of the diaphragm, and eventually an equilibrium or balance point is reached where a relatively constant flow of conditioned air is directed into the room. The flow sensor 28 precludes an excessively high rate of air flow into the room.

As the temperature in the room decreases, as sensed by the room sensor T1 and communicated to the control center satellite by controller 64, it increases the voltage of the signal applied to the electro-pneumatic transducer. The transducer then restricts the control port 54. When the set temperature point of 75° F. is reached, controller 64 applies the maximum 15 volt D.C. signal to transducer 52, and the control port is then restricted to the maximum extent in order to achieve a pressure in conduit 50 of at least 0.05 inch W.G. The pressure applied to the underside of the diaphragm 40 by conduit 44 from the supply pressure pickup fitting 26 and through conduit 56 from the flow sensor 28 then builds up sufficiently to displace the diaphragm upwardly so that it closes orifice 36. The supply pressure is then applied to bladder 18 through conduits 30 and 22 to effect inflation of the bladder and closing of the outlet slot 12 to cut off the flow of conditioned air.

When transducer 52 is in an intermediate condition, the pressure in conduit 50 is between 0 and 0.05 inch W.G. The pressure below diaphragm 40 is then maintained by a combination of the supply pressure and the velocity sensor pressure. If the flow through slot 12 is low, the pressure at the flow sensor is relatively low and there is not enough pressure applied to the underside of the diaphragm to maintain it closed. Consequently, orifice 36 is open and air is bled from bladder 18 thereby increasing the air flow through slot 12. Conversely, if the air flow is relatively high, the flow at the flow sensor 28 increases the pressure below the diaphragm to effect closing of orifice 36. The bladder pressure then increases, and the air flow eventually reaches its balance point.

The controls function in a similar manner to control the distribution of heated air when the system is in the heating mode. If the electronic control center is programmed to eliminate heating overnight or at other times when the building is unoccupied, such as weekends, the satellite controller 64, under the influence of the programmed control center 60, applies a constant maximum 15 volt signal to the transducer. Assuming supply pressure is available, bladder 18 is then maintained in a fully inflated condition to completely close off the outlet slot 12 during the time period when no heating is required. If it is desired to effect a fast morning warm-up of the building, the control center is programmed such that controller 64 applies a minimum 0 volt signal to the transducer before the building becomes occupied in the morning. Bladder 18 is then fully deflated to achieve maximum flow of heated air into the space served by the terminal unit. It should be noted that the outside temperature affects the time at which morning warm-up must be initiated in order to achieve a comfortable temperature level in the building at the time it becomes occupied. Thus, the outside temperature can be monitored and, under program control, affects the time at which morning warm-up of the building begins, as will be explained more fully.

A typical supply pressure at fitting 26 is about one inch W.G., and a typical pressure beneath diaphragm 40 is about 0.1 inch W.G. With these pressures and with properly sized orifices, the pressure differentials across the orifices are such that the system operates in the aforesaid manner to effect control of the areas it serves.

FIG. 3 illustrates an alternative form of the invention wherein a single electro-pneumatic transducer 52 is used to control the pneumatic circuits for a number of terminal units. Each pneumatic circuit is generally the same as that shown in FIG. 2, except that the conduit 50 of each circuit terminates in an orifice 70 which is controlled by a room thermostat 72 located in the area served by the terminal unit. Each thermostat 72 operates independently and may be controlled by a bimetal or any other suitable thermostat arrangement.

Also connected to the relay below diaphram 40 and above orifice 51 is a conduit 74 having an orifice 76 therein. The conduits 74 all connect with another conduit 78 which connects at its opposite end with the high pressure conduit 44 associated with one of the pneumatic circuits, or with a separate centrally located supply pressure pickup 79, as shown. The transducer 52 which controls all of the pneumatic circuits interrupts the line 78 between the supply pressure pickup and the connection of line 78 with line 74. Although only two pneumatic circuits are shown in FIG. 3, it is to be understood that virtually any desired number of terminal units can be controlled by the transducer, as indicated by the "TO OTHER UNITS" legend.

In operation of the arrangement shown in FIG. 3, the electric signal applied to transducer 52 by the associated satellite controller effects control of each terminal unit. If the minimum zero volt signal is applied to the transducer, the control port 54 is fully open. Then, the pressure in line 78 is at the supply pressure. The same pressure is transmitted to lines 74 and, through orifices 76, to the underside of diaphram 40. Regardless of the condition of the thermostat 72, the pressure drop across each orifice 51 is insufficient to bleed enough pressure from beneath diaphram 40 to open orifice 36. All of the orifices 36 are thus closed, and all of the bladders 18 are fully inflated to fully close all of the duct outlets 12. The flow of conditioned air to all of the areas served by the transducer is then shut off regardless of the settings of the thermostats 72.

The control level of the terminal units served by transducer 72 can be reset by varying the electric signal applied to the transducer in the intermediate range between 0 and 15 volts. The pressure in line 78 is varied in proportion to the electric signal applied to the transducer, and the pressures in the plenums under the diaphram 40 are maintained by a combination of the thermostat 72 and the pressure controlled by the transducer. Thus, a change in the electric signal applied to the transducer resets the velocity down wind in all of the units under control by biasing upward all of the pressures under the diaphragm 40.

Applying a maximum voltage to transducer 54 removes pressure from conduits 78 and 74 and allows each of the units to function normally. Orifice 76 suppresses interaction between units and allows them to function independently.

FIG. 4 shows an arrangement for achieving complementary results to those of the system of FIG. 3. As shown in FIG. 4, each conduit 50 connects with a pneumatic amplifier 84 having a diaphragm 86. Line 50 leads to one side of the diaphragm and normally communicates with a short exhaust conduit 88 having an orifice 90 which is opened and closed by the diaphragm.

A thermostat controlled conduit 92 leads to the opposite side of each diaphragm 86. Each conduit 92 terminates in an orifice 94 which is controlled by a room thermostat 96 located in the area served by the terminal unit. The electro-pneumatic transducer 52 is mounted in a conduit 98 which receives the high supply pressure in the ventilating ducts. Conduit 98 connects through the transducer with a number of conduits 100 leading to the respective amplifiers 84. Each conduit 100 connects through an orifice 102 with the same side of diaphragm 86 as conduit 92. Although only two pneumatic circuits are shown in FIG. 4, additional circuits can be controlled by the transducer, as indicated by the "TO OTHER UNITS" legend.

When a minimum zero volt signal is applied to the transducer 52 shown in FIG. 4, the transducer is closed, interrupting the connection between conduits 98 and 100, and each line 100 is reduced to essentially zero gauge pressure. Each diaphragm 86 is then moved away from the orifice 90 it controls, and the pressure in each line 50 is then exhausted through conduit 88. In this condition, each diaphragm 40 drops away from orifice 36, and each bladder 18 is deflated such that all of the duct outlets 12 are fully opened to their maximum flow points.

When the maximum 15 volt signal is applied to the transducer 52, transducer 52 is open and lines 100 are at maximum pressure. Each diaphragm 86 then operates its orifice 90 in response to the thermostat 96.

The electro-pneumatic transducers shown in the arrangements of FIGS. 3 and 4 can be controlled by the satellite controller 66 in the manner illustrated by the block diagram of FIG. 5. Controller 66 receives 24 volt ac power and receives inputs from a sensor such as a fire/smoke sensor 108. Under the control of the electronic control center 60, the satellite controller 66 responds to the input from the sensor 108 to provide a dc electrical signal of 0–15 volts to the transducer E-P which corresponds to the transducers 52 shown in FIGS. 3 and 4.

By using sensor 112 to monitor the total electric load of the building, the operation of the heating and cooling equipment is controlled in a manner to avoid exceeding a preselected maximum electric load level during peak demand periods. Similarly, by using the sensors 110 to monitor the outside weather conditions, the outside temperature can be taken into account in optimizing the timing of the fast morning warm-up in the building and other operations. Detecting the presence of fire conditions by means of one or more fire/smoke sensors 108 permits the air distribution system on the floor of the fire to be shut off completely, while the systems on the floors surrounding the fire can be fully opened to pressurize the adjacent floors and prevent the spreading of the fire and smoke. Normally, the sensed building temperature controls the air distribution system with overriding provided when necessary by the sensor 108.

Figure 6:
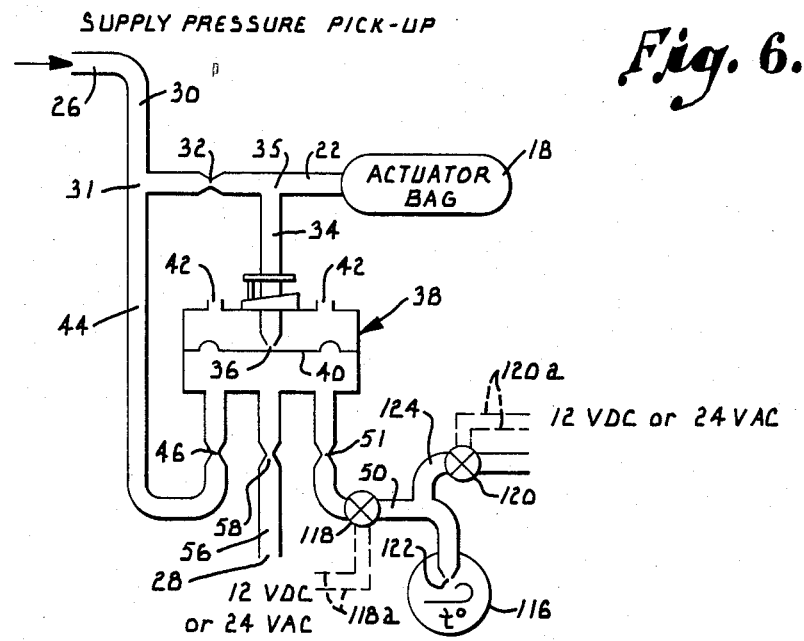
FIG. 6 is a schematic diagram of a pneumatic circuit controlled by a pair of electric solenoid valves in accordance with yet another form of the invention.

FIG. 6 illustrates still another arrangement providing an interface between the electronic components and the pneumatic circuit of the system powered terminal unit. The pneumatic circuit is identical to that shown in FIG. 2, except that the electro-pneumatic transducer and its control port are eliminated and replaced by a conventional room thermostat 116 and a pair of electric solenoid valves 118 and 120. The thermostat 116 controls an orifice 122 formed in the end of conduit 50. Valve 118 is located in conduit 50 between orifices 51 and 122. The other solenoid valve 120 is located in a branch conduit 124 which is vented at one end and which connects at the opposite end with conduit 50 at a location between thermostat 116 and valve 118.

Valves 118 and 120 are direct acting solenoid valves that are capable of controlling the low pressures that are present in the system powered terminal unit. Each valve has a solenoid that is operated by 12 volt dc power (or 24 volt ac power) applied by the satellite controller under the control of the electronic control center 60. Each solenoid valve is normally closed and opens when provided with 12 volt dc power (or 24 volt ac power) on respective conductors 118a and 120a.

In operation of the system shown in FIG. 6, the terminal unit is shut down unless valve 118 is provided with a 12 volt electric signal. If power is not applied to valve 118, it is closed and causes pressure build up on the underside of diaphragm 40. The diaphragm then closes orifice 36 and causes bladder 18 to fully inflate, thus closing the duct outlet 12. The terminal unit can be shut down in this manner by closing valve 118 regardless of the condition of the thermostat 116.

When a 12 volt dc (or 24 volt ac) signal is applied to both of the solenoid valves 118 and 120, both valves are open and the terminal unit is fully opened in the fast warm-up condition of operation. When both valves are opened, the pressure below diaphragm 40 is relieved through conduit 124 regardless of the condition of the thermostat 116. The diaphragm then opens the control orifice 36, and bladder 18 is fully deflated to fully open the duct outlet 12. Conditioned air flows into the area served by the thermostat at a maximum rate to achieve, for example, a fast warm-up of the area in the morning.

When valve 118 receives an electrical signal but valve 120 does not, valve 118 is open and valve 120 is closed. This is the normal operating condition, and the thermostat 116 controls the air flow through the duct outlet by controlling the thermostat orifice 122. The thermostat then has full control over the room temperature.

Figure 7:
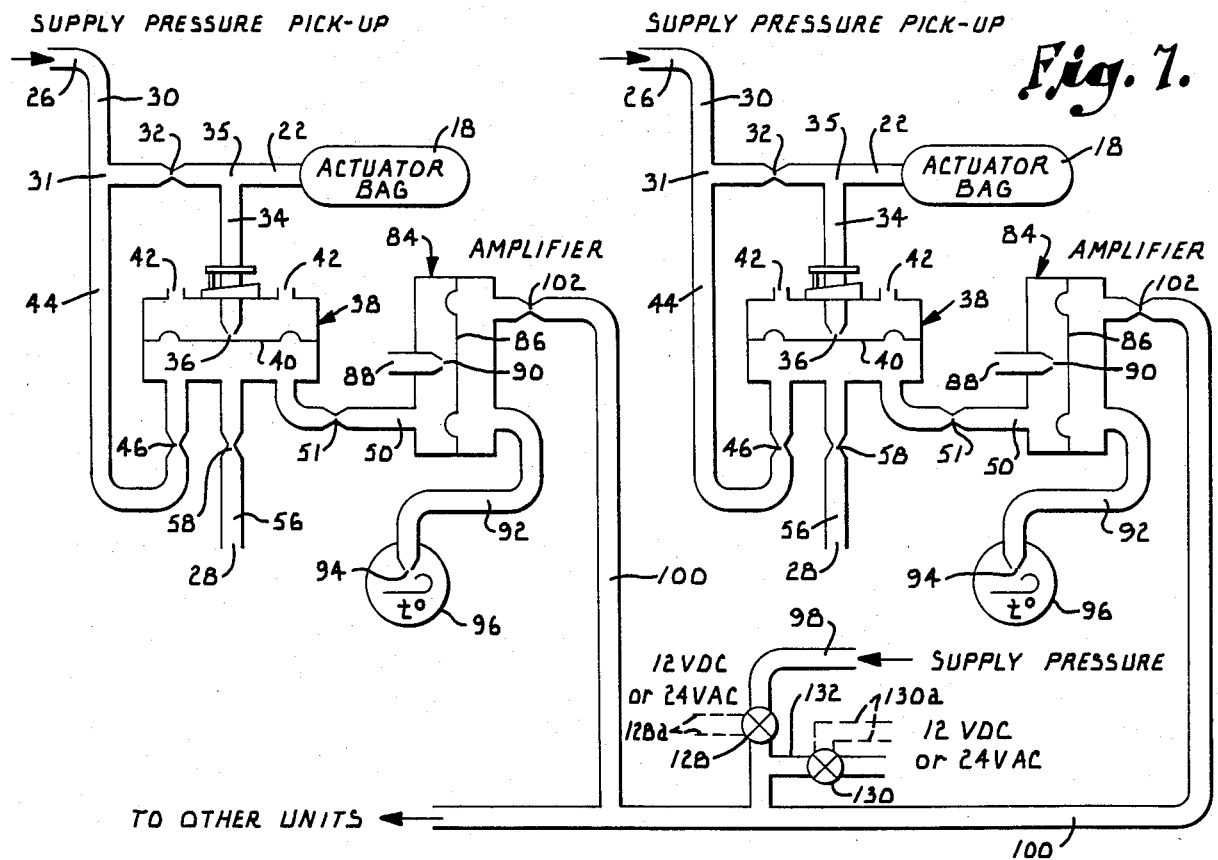
FIG. 7 is a schematic diagram showing plural pneumatic circuits collectively controlled by a pair of electric solenoid valves in accordance with still another form of the invention.

FIG. 7 shows a pair of pneumatic circuits like those of FIG. 4 controlled by a solenoid valve arrangement similar to that of FIG. 6. The arrangement of FIG. 7 is identical to the FIG. 4 arrangement, except that the electro-pneumatic transducer 52 is eliminated and replaced by a pair of solenoid valves 128 and 130. Valves 128 and 130 are identical to the solenoid valves 118 and 120 shown in FIG. 6. Valve 128 is located in the high pressure conduit 98, while valve 130 is located in a short branch conduit 132 which is vented at one end and which connects at the opposite end with conduit 98. Conductors 128a and 130a apply electric signals from the satellite controller to the respective valves 128 and 130.

Whenever valve 130 receives a 12 volt electric signal, it opens to relieve the pressure applied to the right side of each amplifier 84 regardless of the condition of the associated thermostat 96. Each diaphragm 86 then opens orifice 90 to relieve the pressure on the bottom side of diaphragm 40. This opens each orifice 36, and all of the bladders 18 are deflated to fully open all of the duct outlets 12. The system is then in a morning warm-up condition to quickly warm-up the building in the morning regardless of the thermostat settings.

When a 12 volt signal is applied to valve 128 but not to valve 130, valve 128 is opened and valve 130 is closed. The relatively high supply pressure in conduit 98 is then transmitted to each conduit 100 and to the right side of each amplifier 84. The high pressure applied through each orifice 102 closes the corresponding diaphragm 86 against its control orifice 90 regardless of the condition of the thermostat 96. The pressure then builds up on the under side of each diaphragm 40 to close all of the orifices 36, thus fully inflating all of the bladders and closing all of the duct outlets 12. Each terminal unit is then closed off regardless of the thermostat condition.

When neither valve 128 and 130 receives a 12 volt signal, both valves are closed, and the pressure on the right side of each diaphragm 86 is solely controlled by the corresponding thermostat 96. This is the normal operating condition of the system since the flow of conditioned air is controlled solely in accordance with whether or not the thermostat is satisfied. Each area is then controlled independently in accordance with its thermostat setting.

It should be understood that the 12 volt electric control signals applied to the solenoid valves of the FIG. 6 and FIG. 7 arrangements can be provided by a satellite controller having only temperature sensors (as the controller 64 shown in FIG. 5), or by a satellite controller which receives additional input signals (such as the controller 66 which receives inputs from the fire/smoke sensor 108, the outdoor sensors 110 or the electric load demand monitor 112).

All of the alternative forms of the invention combine the desirable features of electronic controls and system powered terminal units. The conditions monitored by the satellite controllers 64 and 66 are provided to the control center 60 in the form of signals representative of the sensed conditions. Under program control, the control center compares the sensed conditions with the user entered data and provides to the satellite controllers electric signals representative of the discrepency between the sensed condition and the desired condition. The satellite controller then provides (to the electro-pneumatic transducer or the solenoid valves) a dc voltage signal having a voltage representative of the discrepency. The transducer or the solenoid valve set then applies a pressure signal to the pneumatic circuit which controls the terminal unit, and the pressure signal adjust the condition of the appropriate bladder 18 such that an increased or decreased rate of conditioned air flows into the area controlled by the bladder. In this manner, each form of the invention controls one or more system powered terminal units to achieve a comfortable temperature level (sensed by the room sensors T1 and T2), to achieve total shut down in the event of a fire (sensed by the fire/smoke sensor 108), to prevent excessive electric load (sensed by the load demand monitor 112), and to initiate fast morning warm-up of the building at the appropriate time to minimize energy consumption (taking into account the outdoor temperature sensed by the outdoor temperature sensors 110).

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. In an air distribution system for applying conditioned air to an area, the improvement comprising:

a duct receiving conditioned air at a relatively high supply pressure, said duct having an outlet for directing conditioned air into said area at a relatively low pressure;

pressure responsive actuator means for controlling the flow of conditioned air through said outlet.

a pneumatic circuit for controlling the pressure applied to said actuator means, said circuit including conduit means providing communication between the duct and actuator means to apply the supply pressure to said actuator means;

a pneumatic relay in said circuit having a pneumatic control line for controlling the condition of the relay, said pneumatic relay being in fluid communication with said conduit means to control the pressure therein in accordance with the pressure in said control line;

an electro-pneumatic transducer disposed in said pneumatic control line for directly applying a pressure signal thereto to control the pressure in said conduit means, said transducer being operable to receive an electrical signal and to directly apply said pressure signal to said control line in accordance with the electrical signal, whereby to control the pressure in said conduit means and the flow of conditioned air through said outlet in accordance with the electrical signal applied to said transducer;

electronic means for sensing a preselected condition and providing an electrical control signal representative of said condition; and means for applying said electrical control signal to said transducer to thereby control the flow of conditioned air into said area solely in accordance with the sensed condition under all conditions of operation.

2. In an air distribution system having a duct receiving conditioned air at a relatively high supply pressure, an outlet in said duct for discharging conditioned air therefrom, actuator means associated with said outlet for controlling the flow of conditioned air therethrough, a pneumatic circuit powered by the supply pressure for controlling said actuator means, and electronic means providing an electrical output signal, the improvement comprising:

a pneumatic amplifier in said circuit arranged therein to control the pressure applied to said actuator means in accordance with the pressure condition of the amplifier;

a thermostat line disposed in fluid communication with said amplifier;

a control line disposed in communication with said amplifier and cooperating with said thermostat line to control the pressure condition of the amplifier;

a thermostat in said thermostat line for controlling the pressure therein in accordance with the condition of the thermostat;

an electro-pneumatic transducer adapted to receive an electrical control signal, said transducer being disposed in fluid communication with said control line in a manner to control the pressure therein in accordance with the control signal applied to the transducer, thereby controlling the flow of conditioned air through said outlet in accordance with the control signal and the condition of the thermostat; and means for applying the output signal of said electronic means to said transducer, whereby to control the flow of conditioned air in accordance with the output signal and the condition of the thermostat.

3. An air distribution system for applying conditioned air to different areas of a building, said system comprising:

a duct in each area receiving conditioned air at a relatively high supply pressure, each duct having an outlet for directing conditioned air into the corresponding area;

a flow control device for each outlet controlling the flow of conditioned air therethrough;

a pneumatic circuit for each flow control device, each circuit being powered by the supply pressure and acting to control the position of the corresponding flow control device to control the air flow through the corresponding outlet;

a common pneumatic control line for all of said pneumatic circuits, said control line being disposed in fluid communication with each of said pneumatic circuits to control the condition thereof in accordance with the pressure in said control line, whereby the position of each flow control device is controlled by the pressure in said control line;

central electronic control means for receiving entered data and comparing the data with electrical input signals applied to the control means;

a remote electronic satellite controller connected with said central control means and operable to sense a condition of the building and apply to the control means an input signal representative of the sensed condition, said satellite controller generating an electric control signal having a characteristic representative of the difference between the entered data and the sensed condition; and an electro-pneumatic transducer electrically connected with said satellite controller to receive said electric control signal therefrom and pneumatically connected with said pneumatic control line to apply a pneumatic output signal thereto, said transducer providing said pneumatic output signal with the pressure thereof being controlled by said characteristic of the electric control signal, whereby said pneumatic output signal is applied via said control line to each of said pneumatic circuits in a manner to effect control of the position of each flow control device to control the flow of conditioned air through each outlet in accordance with the difference between the entered data and the sensed condition.

4. An air distribution system for distributing conditioned air in a building, said system comprising:
a duct receiving conditioned air at a relatively high supply pressure, said duct having an outlet for discharging conditioned air therefrom;
a flow control device for controlling the flow of conditioned air through said outlet;
a pneumatic circuit powered by the supply pressure and connected with said flow control device to control the position thereof;
a satellite controller for monitoring different conditions of the building sensed by the controller;
central electronic control means connected with said satellite controller for receiving therefrom the sensed conditions and comparing same with data entered in the control means;
means associated with said satellite controller for generating an electric control signal when a predetermined relationship exists between the sensed conditions and the entered data; and
an electro-pneumatic transducer having an electrical connection with said satellite controller and a direct conduit connection with said pneumatic circuit, said transducer receiving said electric control signal from said satellite controller and responding thereto in a manner to directly affect the pressure in said pneumatic circuit to control the position of said flow control device in accordance with the control signal in all operating conditions, whereby the control signal controls the flow of conditioned air through the outlet of said duct.

5. In an air distribution system for applying conditioned air to an area within a building, the combination of:
a duct receiving conditioned air at a relatively high supply pressure, said duct having an outlet for directing conditioned air into said area at a relatively low pressure;
a pressure actuated control device for controlling the flow of air through said outlet;
a pneumatic circuit powered by the supply pressure and applying pressure to the flow control device to control the position of same, thereby controlling the air flow through said outlet;
a thermostat controlled conduit communicating with said pneumatic circuit, said circuit responding to the pressure in said conduit to control the pressure applied to the flow control device;
thermostat means responsive to the temperature in said area for normally controlling the pressure in said conduit, said thermostat means when satisfied effecting a relatively high pressure in said conduit to effect restriction of said outlet and when not satisfied effecting a relatively low pressure in said conduit to reduce the restriction of said outlet;
a first solenoid valve in said conduit between said pneumatic circuit and said thermostat means;
a branch line having one end vented and an opposite end communicating with said conduit at a location between said first solenoid valve and said thermostat means;
a second solenoid valve in said branch line, each valve having an open position and a closed position;
means for monitoring the building and providing electric signals indicative of the monitored conditions of the building; and
means for applying said electric signals to said solenoid valve means in a manner to selectively close said first valve to isolate said thermostat means from said pneumatic circuit in a shutdown condition wherein a relatively high pressure is effected in said conduit to close said outlet regardless of the condition of said thermostat means, to selectively open said first valve and close said second valve in a normal condition wherein said valves do not affect the influence of said thermostat means on the pressure in said conduit, and to selectively open both valves to exhaust the pressure from said conduit in a fast warmup condition wherein said outlet is open regardless of the condition of said thermostat means.

6. In an air distribution system for applying conditioned air to separate areas of a building, the combination of:
a duct for each area receiving conditioned air at a relatively high supply pressure, each duct having an outlet for directing conditoned air into the corresponding area at a relatively low pressure;
a pressure actuated control device for each outlet controlling the flow of conditioned air therethrough;
a pneumatic circuit for each flow control device, each circuit being powered by the supply pressure and applying pressure to the corresponding flow control device to control the position of same, thereby controlling the air flow through the corresponding outlet;
a thermostat controlled conduit for each pneumatic circuit communicating therewith, each circuit responding to the pressure in the corresponding conduit to normally control the pressure applied to the corresponding flow control device;
thermostat means for each area responsive to the temperature therein for normally controlling the pressure in the corresponding conduit, said thermostat means when satisfied effecting a relatively high pressure in the corresponding conduit to effect restriction of the corresponding outlet and when not satisfied effecting a relatively low pressure in the corresponding conduit to reduce the restriction of the corresponding outlet;
a control line disposed in communication with each pneumatic circuit to affect the pressure therein, said control line having a high pressure condition wherein each outlet is closed regardless of the condition of said thermostat means and a low pressure condition wherein each outlet is open regardless of the condition of the thermostat means;
a first solenoid valve located between said control line and a vent to thereby effect the low pressure condition of the control line whenever said first valve is open;
a second solenoid valve located between said control line and an air source to thereby effect the high pressure condition of the control line whenever said first valve is closed and said second valve is open;
electronic means for monitoring the building and providing electric signals indicative of the monitored conditions of the building; and means for applying said electric signals to said solenoid valves in a manner to selectively close both valves in a normal operating condition, to selectively open said first valve in a fast warmup condition and to selectively close said first valve and open said second valve in a shutdown condition.

7. The system of claim 3, including an orifice between each pneumatic circuit and said control line for preventing the condition of each circuit from influencing the other circuits.

8. In an air distribution system for applying conditioned air to separate areas of a building, the combination of:
- a duct for each area, each duct receiving conditioned air at a relatively high supply pressure and each duct having an outlet for directing the conditioned air into the corresponding area;
- a pressure responsive control device for each outlet controlling the flow of conditioned air therethrough;
- a pneumatic circuit for each flow control device, each circuit being powered by the supply pressure and including an actuator for controlling the pressure applied to said flow control device in accordance with the pressure conditions of the corresponding actuator;
- a pneumatic amplifier in each pneumatic circuit disposed in fluid communication with the corresponding actuator to control the pressure condition thereof;
- a thermostat controlled line disposed in fluid communication with each amplifier, each line having a thermostat for controlling the pressure therein;
- a common control line communicating with each amplifier and cooperating with the thermostat controlled line to control the pressure of the amplifier;
- an electro-pneumatic transducer connected with said control line to control the pressure therein, said transducer being operable to receive electrical signals and to control the pressure in said control line in accordance with the received signal; and
- electronic means for sensing a preselected condition in the building and applying to said transducer an electrical signal representative of said condition, whereby the flow of conditioned air into each area is controlled by the thermostat in the area in conjunction with the condition sensed by said electronic means.

* * * * *